US012602355B2

(12) United States Patent
Olson

(10) Patent No.: US 12,602,355 B2
(45) Date of Patent: Apr. 14, 2026

(54) LLM-BASED GAME SCHEMA GENERATION, CROSS-REFERENCING, AND INSTANTIATION

(71) Applicant: Sony Interactive Entertainment LLC, San Mateo, CA (US)

(72) Inventor: Joseph Logan Olson, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 18/809,705

(22) Filed: Aug. 20, 2024

(65) Prior Publication Data

US 2026/0056920 A1 Feb. 26, 2026

(51) Int. Cl.
G06F 16/21 (2019.01)
A63F 13/60 (2014.01)
G06F 8/30 (2018.01)

(52) U.S. Cl.
CPC ............ G06F 16/211 (2019.01); A63F 13/60 (2014.09); G06F 8/30 (2013.01)

(58) Field of Classification Search
CPC .......... G06F 16/211; G06F 8/30; A63F 13/60
See application file for complete search history.

(56) References Cited

U.S. PATENT DOCUMENTS

| | | | |
|---|---|---|---|
| 2018/0137146 A1* | 5/2018 | Mayer | G06F 16/284 |
| 2025/0045023 A1* | 2/2025 | Chakhvadze | G06F 8/70 |

* cited by examiner

*Primary Examiner* — Tyler J Torgrimson
(74) *Attorney, Agent, or Firm* — Fish & Richardson P.C.

(57) ABSTRACT

In one aspect, schemas for interactive content creation may be created using large language models (LLMs). The schemas may refer to one another and may be used to build schema instances off the schemas themselves. The schema instances may also refer to each other. Computer code for actions in the interactive content can then be written in a given programming language to refer to the schemas and schema instances, enabling quick code creation with less chances of crashing due to the strongly-typed language being used, including the schema references to each other. The interactive content might be video game content or another type of interactive content.

17 Claims, 11 Drawing Sheets

Receive a first text prompt indicating a request to create a first schema for a first game object of a video game —900

Provide the first text prompt to LLM —905

Receive first output indicating first structured data for the first schema according to the first text prompt —910

Receive a second text prompt, indicating a request to create a second schema for a second game object of the video game with the second schema referring to the first schema —915

Provide the second text prompt to the LLM —920

Receive a second output from the LLM indicating second structured data for the second schema according to the second text prompt with the second structured data referring to the first schema —925

Represent the first and second structured data on a display —930

Receive a third text prompt indicating a request to create a first schema instance based on the first schema —935

Provide the third text prompt to the LLM —940

Receive a third output from the LLM indicating third structured data for the first schema instance according to the third text prompt —945

Represent the third structured data on the display —950

Receive a fourth text prompt indicating a request to create a second schema instance based on the second schema —955

Provide the fourth text prompt to the LLM —960

Receive a fourth output from the LLM indicating fourth structured data for the Second schema instance according to the fourth text prompt —970

Represent the fourth structured data on the display —980

Receive a fifth text prompt indicating a game action to write in Javascript —985

Provide the fifth text prompt to the LLM —990

To block 1000

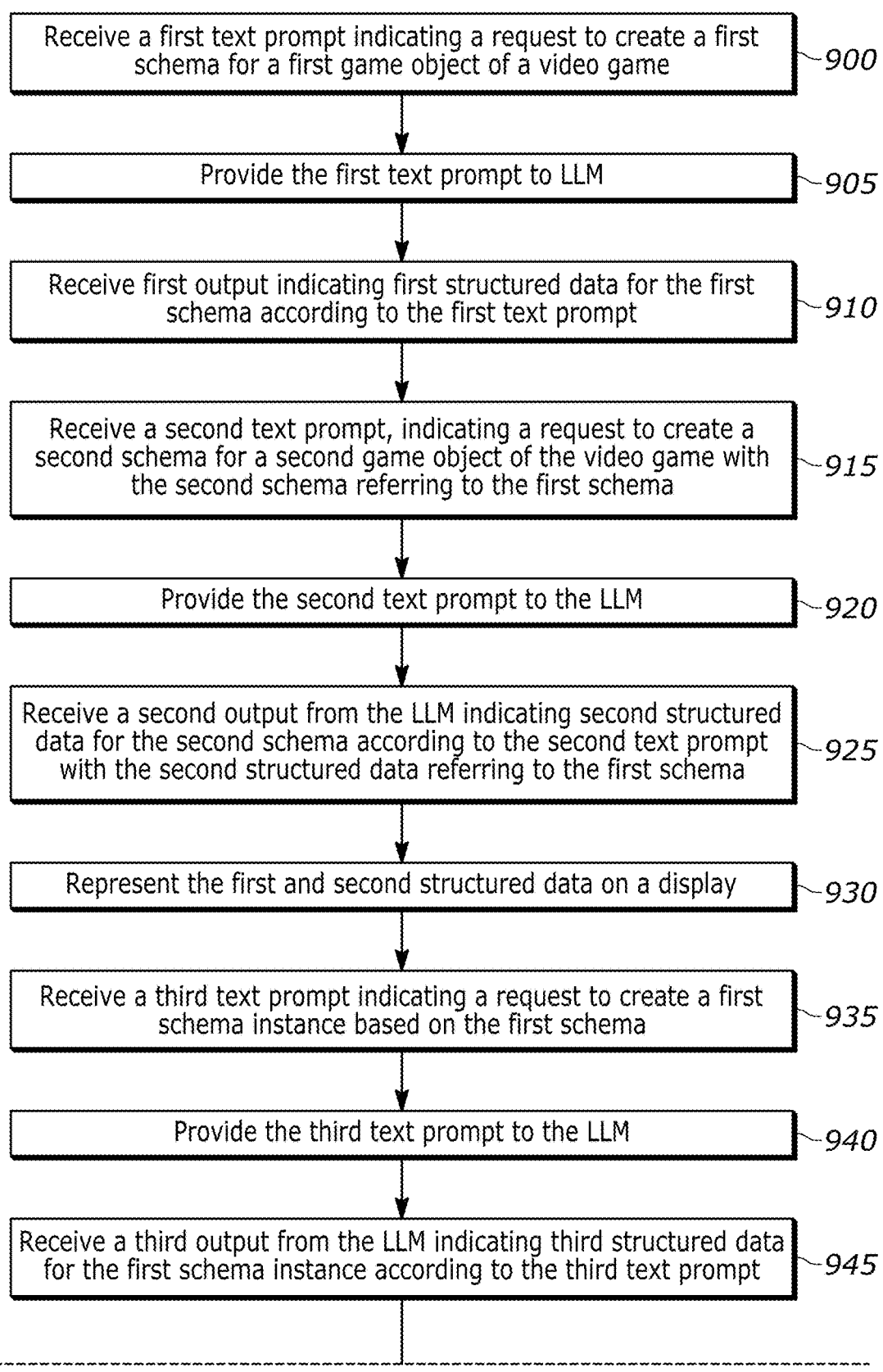

Receive a first text prompt indicating a request to create a first schema for a first game object of a video game ~900

Provide the first text prompt to LLM ~905

Receive first output indicating first structured data for the first schema according to the first text prompt ~910

Receive a second text prompt, indicating a request to create a second schema for a second game object of the video game with the second schema referring to the first schema ~915

Provide the second text prompt to the LLM ~920

Receive a second output from the LLM indicating second structured data for the second schema according to the second text prompt with the second structured data referring to the first schema ~925

Represent the first and second structured data on a display ~930

Receive a third text prompt indicating a request to create a first schema instance based on the first schema ~935

Provide the third text prompt to the LLM ~940

Receive a third output from the LLM indicating third structured data for the first schema instance according to the third text prompt ~945

FIG. 9

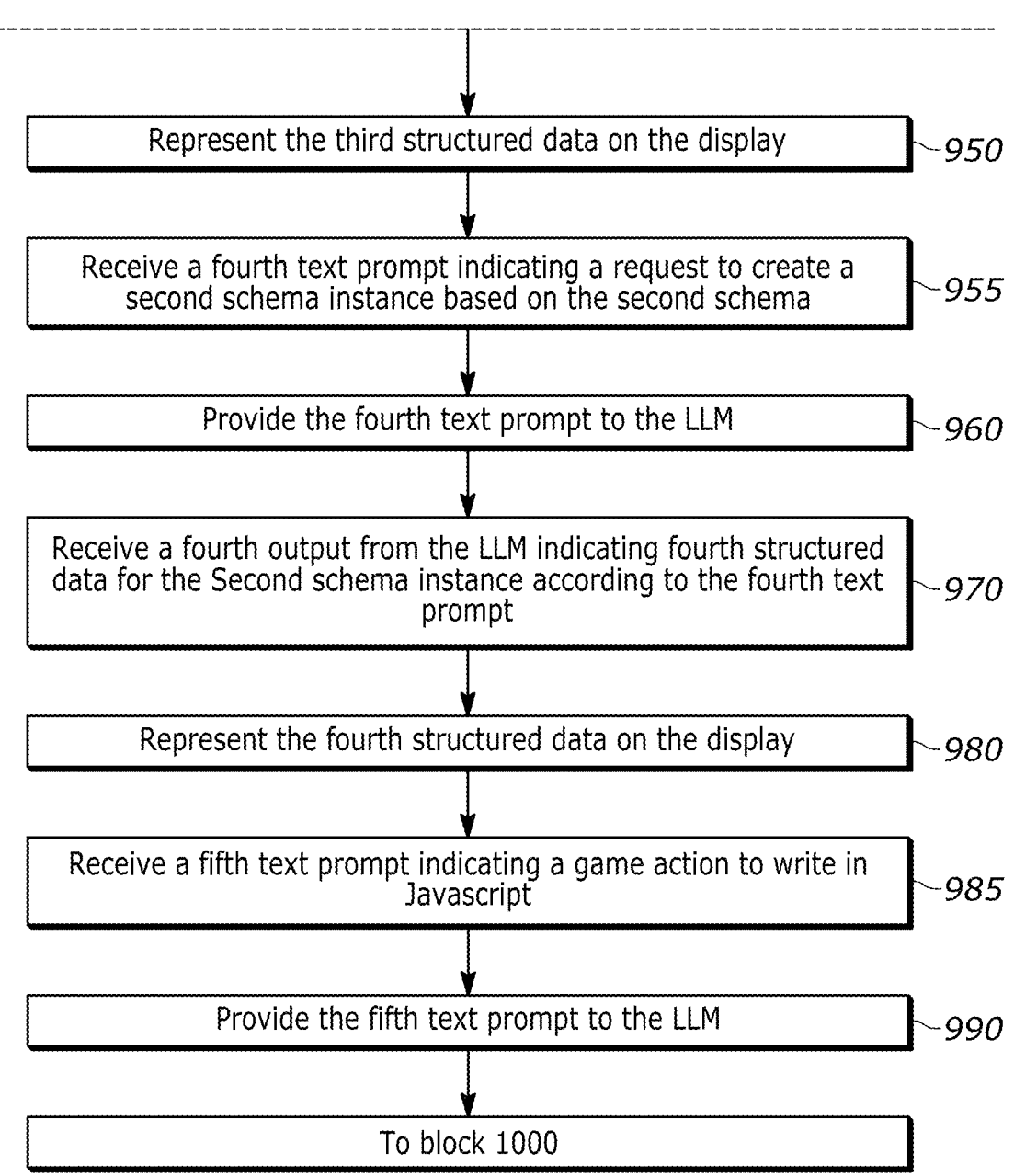

Represent the third structured data on the display ~950

Receive a fourth text prompt indicating a request to create a second schema instance based on the second schema ~955

Provide the fourth text prompt to the LLM ~960

Receive a fourth output from the LLM indicating fourth structured data for the Second schema instance according to the fourth text prompt ~970

Represent the fourth structured data on the display ~980

Receive a fifth text prompt indicating a game action to write in Javascript ~985

Provide the fifth text prompt to the LLM ~990

To block 1000

FIG. 9 (Continued)

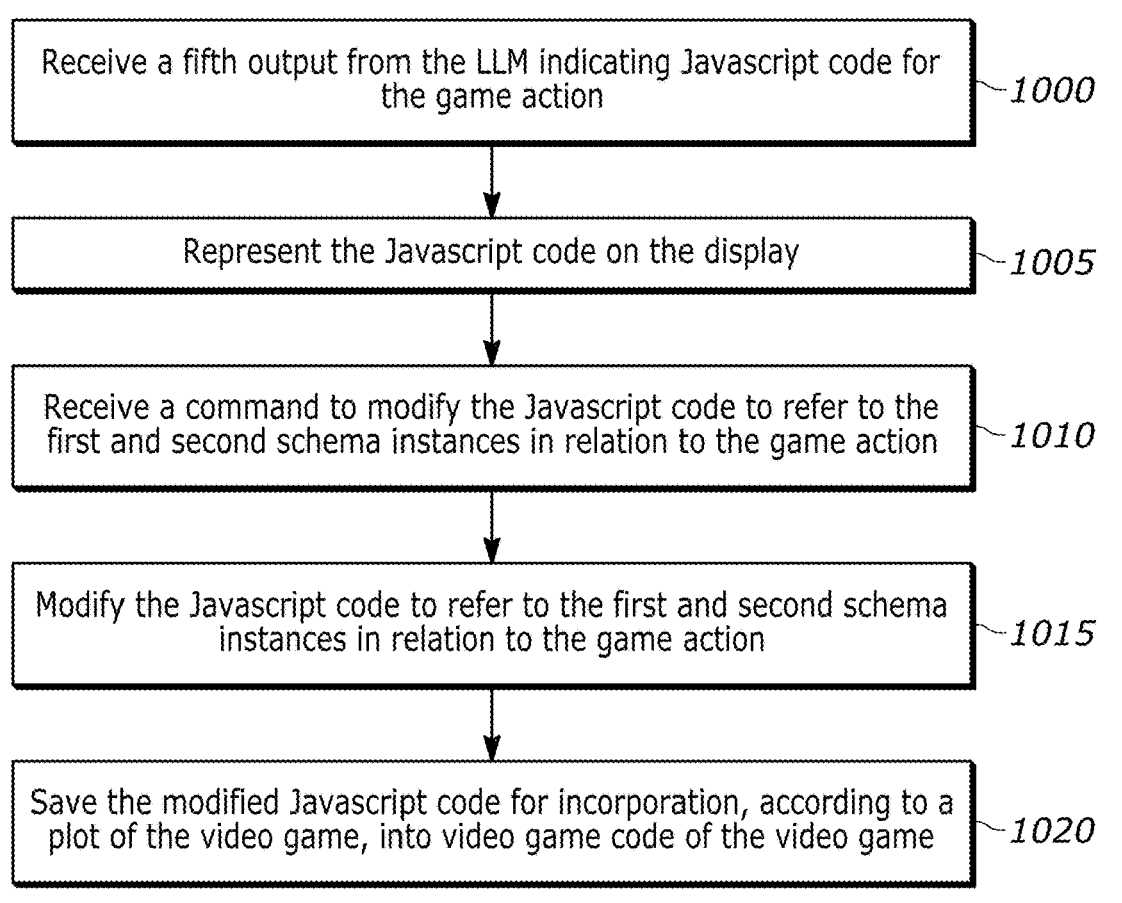

Receive a fifth output from the LLM indicating Javascript code for the game action ~1000

Represent the Javascript code on the display ~1005

Receive a command to modify the Javascript code to refer to the first and second schema instances in relation to the game action ~1010

Modify the Javascript code to refer to the first and second schema instances in relation to the game action ~1015

Save the modified Javascript code for incorporation, according to a plot of the video game, into video game code of the video game ~1020

FIG. 10

AI Model Architecture

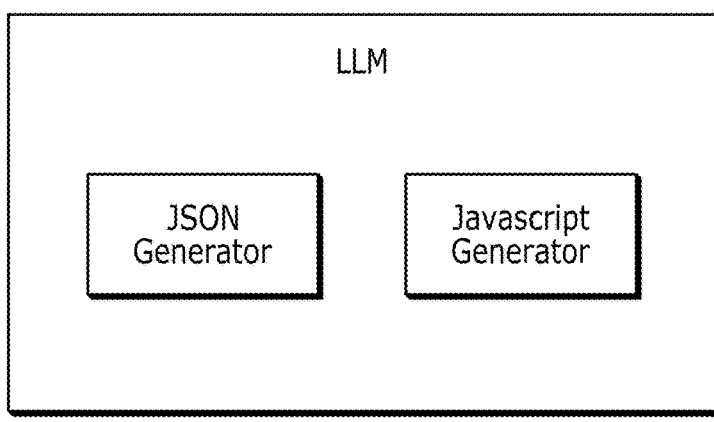

LLM

JSON Generator

Javascript Generator

FIG. 11

LLM-BASED GAME SCHEMA GENERATION, CROSS-REFERENCING, AND INSTANTIATION

FIELD

The disclosure below relates to technically inventive, non-routine solutions that are necessarily rooted in computer technology and that produce concrete technical improvements. In particular, the disclosure below relates to large language model-based video game schema generation, cross-referencing, and instantiation.

BACKGROUND

As recognized herein, computer coding of video games is very intensive and error-prone. As further recognized herein, current coding devices fail to remedy many of these shortcomings. Accordingly, there are currently no adequate solutions to the foregoing computer-related, technological problem.

SUMMARY

Accordingly, in one aspect an apparatus includes at least one processor system programmed with instructions to receive a first text prompt that indicates a request to create a first schema for a first game object of a video game. The at least one processor system is also programmed to provide the first text prompt to a large language model (LLM), and to receive a first output from the LLM. The first output indicates first structured data for the first schema according to the first text prompt. The at least one processor system is also programmed to receive a second text prompt that indicates a request to create a second schema for a second game object of the video game, with the second schema referring to the first schema. From there the at least one processor system is programmed to provide the second text prompt to the LLM, and to receive a second output from the LLM. The second output indicates second structured data for the second schema according to the second text prompt, with the second structured data referring to the first schema. The at least one processor system is also programmed to represent the first and second structured data on a display.

Additionally, in some instances the at least one processor system may be configured to receive a third text prompt that indicates a request to create a first schema instance based on the first schema, and to provide the third text prompt to the LLM. The at least one processor system may also be configured to receive a third output from the LLM that indicates third structured data for the first schema instance according to the third text prompt, and to represent the third structured data on the display.

If desired, in some examples the at least one processor system may also be configured to receive a fourth text prompt that indicates a request to create a second schema instance based on the second schema. The at least one processor system may also be configured to provide the fourth text prompt to the LLM, and to receive a fourth output from the LLM. The fourth output may indicate fourth structured data for the second schema instance according to the fourth text prompt. The at least one processor system may be further configured to represent the fourth structured data on the display.

What's more, in various examples the at least one processor system may even be configured to receive a fifth text prompt that indicates a game action to write in Javascript.

The at least one processor system may be configured to provide the fifth text prompt to the LLM, and to receive a fifth output from the LLM. The fifth output may indicate Javascript code for the game action. The at least one processor system may be further configured to represent the Javascript code on the display, and to then receive a command to modify the Javascript code to refer to the first and second schema instances in relation to the game action. The at least one processor system may also be configured to, based on the command, modify the Javascript code to refer to the first and second schema instances in relation to the game action. If desired, from there the at least one processor system may be configured to save the modified Javascript code for incorporation, according to a plot of the video game, into video game code of the video game.

In various example implementations, the LLM may use a Javascript generator to output the Javascript code.

Also in various example implementations, the first and second structured data may be output by the LLM in JavaScript Object Notation (JSON) format.

What's more, in some non-limiting examples, the first and second schemas may relate to a character for the video game, a weapon for the video game, an inventory asset for the video game, a location within a game world of the video game, and/or another type of game object of the video game.

In another aspect, a method includes receiving a first text prompt indicating a request to create a first schema for a first game object of a video game. The method also includes providing the first text prompt to a model and receiving a first output from the model, with the first output indicating the first schema according to the first text prompt. The method also includes receiving a second text prompt indicating a request to create a second schema for a second game object of the video game, and then providing the second text prompt to the model. The method further includes receiving a second output from the model indicating the second schema according to the second text prompt, with the second schema containing a reference to the first schema. The method then includes representing the first and second schemas on a display.

In certain cases, the model may include a large language model (LLM).

Also in certain cases, the method may include receiving a third text prompt indicating a request to create a first schema instance based on the first schema. Here the method may then include providing the third text prompt to the model, and receiving a third output from the model. The third output may indicate the first schema instance according to the third text prompt. The method may then include representing the first schema instance on the display.

Still further, in some cases the method may further include receiving a fourth text prompt indicating a request to create a second schema instance based on the second schema, and then providing the fourth text prompt to the model. The method may then include receiving a fourth output from the model that indicates the second schema instance according to the fourth text prompt, and representing the second schema instance on the display.

Furthermore, if desired the method may then include receiving a fifth text prompt indicating a game action to write in programming code, and providing the fifth text prompt to a programming code generator. The method may further include receiving a fifth output from the programming generator, with the fifth output indicating programming code for the game action. The method may then include representing the programming code on the display.

What's more, if desired the method may further include tailoring the programming code to refer to the first and second schema instances in relation to the game action.

Also if desired, the first, second, third, and fourth structured data may be output by the model in JavaScript Object Notation (JSON) format.

In still another aspect, an apparatus includes at least one computer readable storage medium (CRSM) that is not a transitory signal. The at least one CRSM includes instructions executable by a processor system to use a model to generate structured data for different schema of a video game, with the different schema referring to each other. The instructions are also executable to, for an action within the video game, autonomously write game code to use the structured data to instantiate the action via the different schema that refer to each other.

In various examples, the data may be structured in JavaScript Object Notation (JSON) format, and the model may include a large language model (LLM). Also in some examples, the game code may be written to refer to different schema instances indicating the structured data.

The details of the present application, both as to its structure and operation, can be best understood in reference to the accompanying drawings, in which like reference numerals refer to like parts, and in which:

BRIEF DESCRIPTION OF THE DRAWINGS

FIGS. 9 and 10 show example logic in example flow chart format that may be executed by a computer consistent with present principles; and FIG. 11 shows example artificial intelligence (AI) model architecture that may be implemented consistent with present principles.

DETAILED DESCRIPTION

Figure 1:
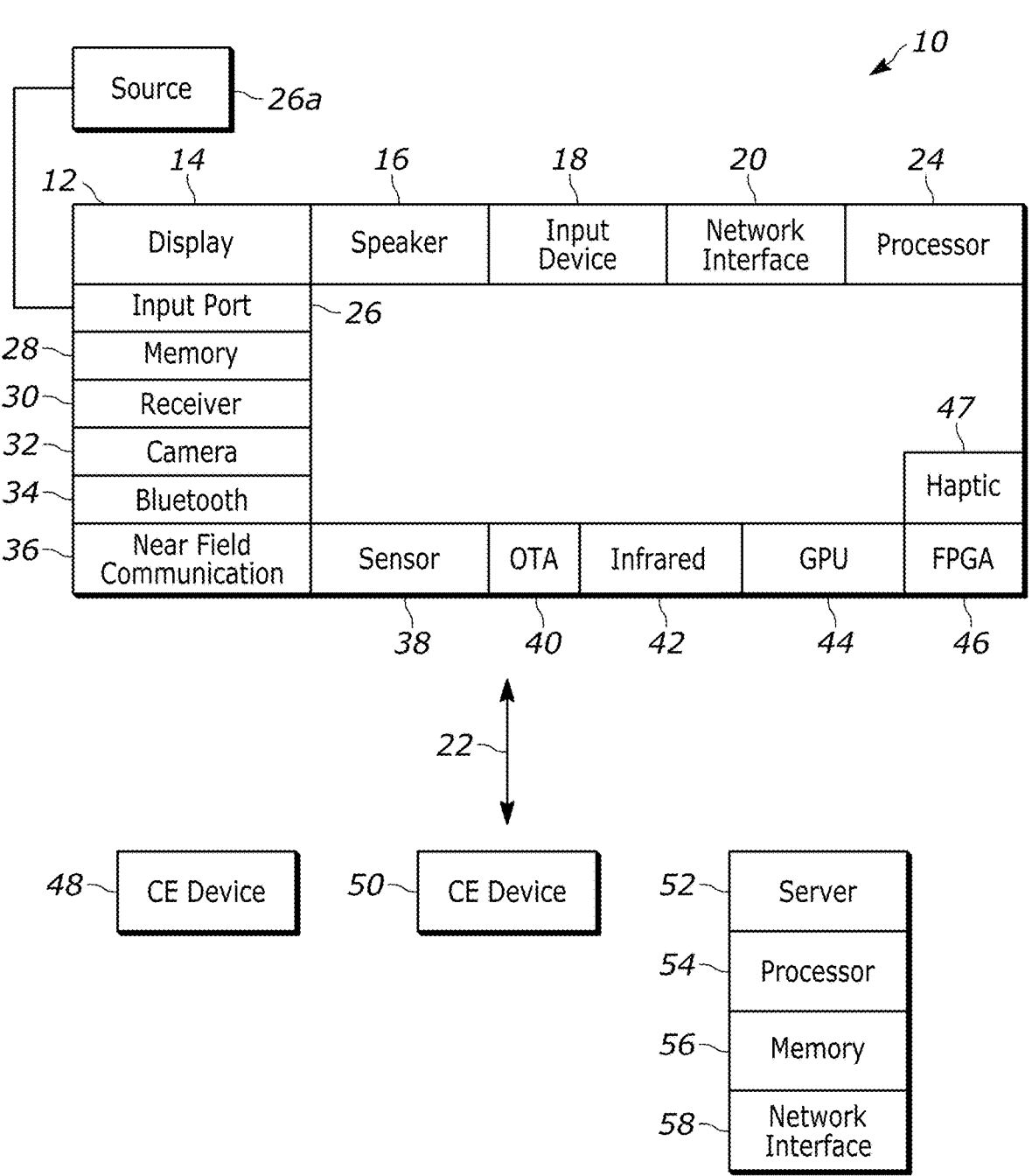
FIG. 1 is a block diagram of an example system consistent with present principles.

The detailed description below provides technical systems and methods for using natural language and LLMs to generate structured data for video games and other digital content. Thus, an artificial intelligence (AI) model may be used to create schemas that relate and refer to each other. The schemas may be for game objects like characters of the video game, video game geolocations within a game world of the video game, weapons for the video game, health packs or other inventory assets for the video game (e.g., ammo), etc. The schemas can see each other, with the schemas written in JSON that can be modified to get references in person-readable views.

Additionally, a Javascript generator may be used to interact with the schemas and instances built off the schemas. The user can then edit the Javascript code as well.

What's more, the LLM may even be used to auto-populate a field of a schema or schema instance. So the user might ask for suggestions and then click on outputs from the LLM to adopt the suggestions and have the LLM/AI model auto-complete the fields.

Accordingly, video game design may be aided with present principles through the creation and use of schemas and instances off the schemas, some or all of which may reference each other. Advantageously, those instances and schemas may interact with each other. In this way, a game designer can quickly composite together a full video game using AI.

As an example, if the game designer wants to create a non-player character (NPC) with weapons, each weapon may be its own game object with its own schema instance so that it is defined for reference to other schema instances and the Javascript code. Thus, schemas and schema instances that know about each other can be bootstrapped together.

In some specific instances, a large, high-powered LLM like GPT-4 may be used. In other instances, a local language model/small LLM and constrained generation library or grammer may be used to enforce schema, in addition to or in lieu of a high-powered LLM running on a server.

Accordingly, it is to be understood more generally that in non-limiting instances, schemas may establish data structures with different fields of different types to be filled in by the computer with particularized game data, thus creating schema instances. Additionally, in some instances an example prompt to the LLM may be a prompt to create a schema instance for a schema that itself has not even been created yet, and so responsive to that prompt the LLM may generate the schema first and then the corresponding schema instance that is requested by the user. Javascript code may then be written to refer to the instances generated via the LLM. The generative Javascript may therefore refer to the schema themselves and/or the instances thereof. What's more, present principles recognize that it is advantageous to have the schemas refer to each other, and to have schema instances refer to each other, so they can validate each other through strongly-typed languages to give certainty and confidence that the code has been configured so that it does not crash. It may therefore be appreciated that present principles enable the dynamic creation of template forms (schemas) that may then be populated with game data (as a schema instance). This type of table generator allows for quick, on-the-fly game creation using AI to generate game code that is less likely to crash.

With the foregoing in mind, it is to be understood that this disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12 consistent with present principles. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be –1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer/video game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player, or a head-mounted display (HMD) worn by a player. The HMD may include a heads-up transparent or nontransparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components discussed in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Also note before describing other figures that selectors and options on the GUIs discussed below may be selected via cursor input, touch input to the touch-enabled display on which the GUI is presented, using voice input, and/or using other input methods.

Having described example operating environments consistent with present principles and now specifically in terms of game data schema generation, cross-referencing, and instantiation using large language models (LLMs), the present disclosure recognizes that computer/video games contain a voluminous amount of structured data. An example of structured data for a monster in a game might be:

```
{
    "id": "mz1-22",
    "name": "SparkyFox",
    "type": "Electric",
    "hp": "70",
    "attacks": [
        {
            "name": "Lightning Swipe",
            "damage": "30",
            "cost": ["Electric", "Colorless"]
        }
    ],
    "weaknesses": [
        {
            "type": "Rock",
            "value": "x2"
        }
    ],
    "rarity": "Common",
    "series": "Mystic Zones",
    "set": "Core Spark",
    "setCode": "mz1",
    "illustrator": "Alex Doe"
}
```

It is to be understood consistent with present principles that the foregoing video game code includes various fields to be filled through game schema, like an enemy, ability, game geolocation, weapon, health pack, etc. The formatting above can be used as JavaScript Object Notation (JSON) code, which the present disclosure recognizes is as an example way of writing code that many programming languages can read. Others are encompassed by present principles as well.

Additionally, in many cases, one might have a set of fields or schemas that many objects or instances of that schema will adhere to. So, for example, the monster in the code above might adhere to the following schema:

```
{
    "$schema": "http://json-schema.org/draft-07/schema#",
    "type": "object",
    "properties": {
        "id": {
            "type": "string"
        },
        "name": {
            "type": "string"
        },
        "type": {
            "type": "string"
        },
        "hp": {
            "type": "string"
        },
        "attacks": {
            "type": "array",
            "items": {
                "type": "object",
                "properties": {
                    "name": {
                        "type": "string"
                    },
                    "damage": {
                        "type": "string"
```

-continued

```
                    },
                    "cost": {
                        "type": "array",
                        "items": {
                            "type": "string"
                        }
                    }
                },
                "required": ["name", "damage", "cost"]
            }
        },
        "weaknesses": {
            "type": "array",
            "items": {
                "type": "object",
                "properties": {
                    "type": {
                        "type": "string"
                    },
                    "value": {
                        "type": "string"
                    }
                },
                "required": ["type", "value"]
            }
        },
        "rarity": {
            "type": "string"
        },
        "series": {
            "type": "string"
        },
        "set": {
            "type": "string"
        },
        "setCode": {
            "type": "string"
        },
        "illustrator": {
            "type": "string"
        }
    },
    "required": ["id", "name", "type", "hp", "attacks",
"weaknesses", "rarity", "series", "set", "setCode", "illustrator"]
}
```

And here's a second example instance of game data using that schema:

```
{
    "id": "mz1-45",
    "name": "AquaDragon",
    "type": "Water",
    "hp": "80",
    "attacks": [
        {
            "name": "Wave Crush",
            "damage": "40",
            "cost": ["Water", "Water", "Colorless"]
        }
    ],
    "weaknesses": [
        {
            "type": "Electric",
            "value": "x2"
        }
    ],
    "rarity": "Rare",
    "series": "Mystic Zones",
    "set": "Core Spark",
    "setCode": "mz1",
    "illustrator": "Chris Park"
}
```

The present disclosure also recognizes that, advantageously, LLMs can be excellent tools for taking unstructured data/user game concepts provided via natural language and backing them into a schema. Also advantageously, the LLMs may then be used to leverage that schema to generate more instances off that schema. This enables game designers to generate game content rapidly in a machine-readable format in a way that helps avoid the game crashing at runtime.

Furthermore, because the JSON code can be created and edited in natural language through the LLM, game designers can visualize the JSON in a style that is less intimidating-through tables.

Figure 2:
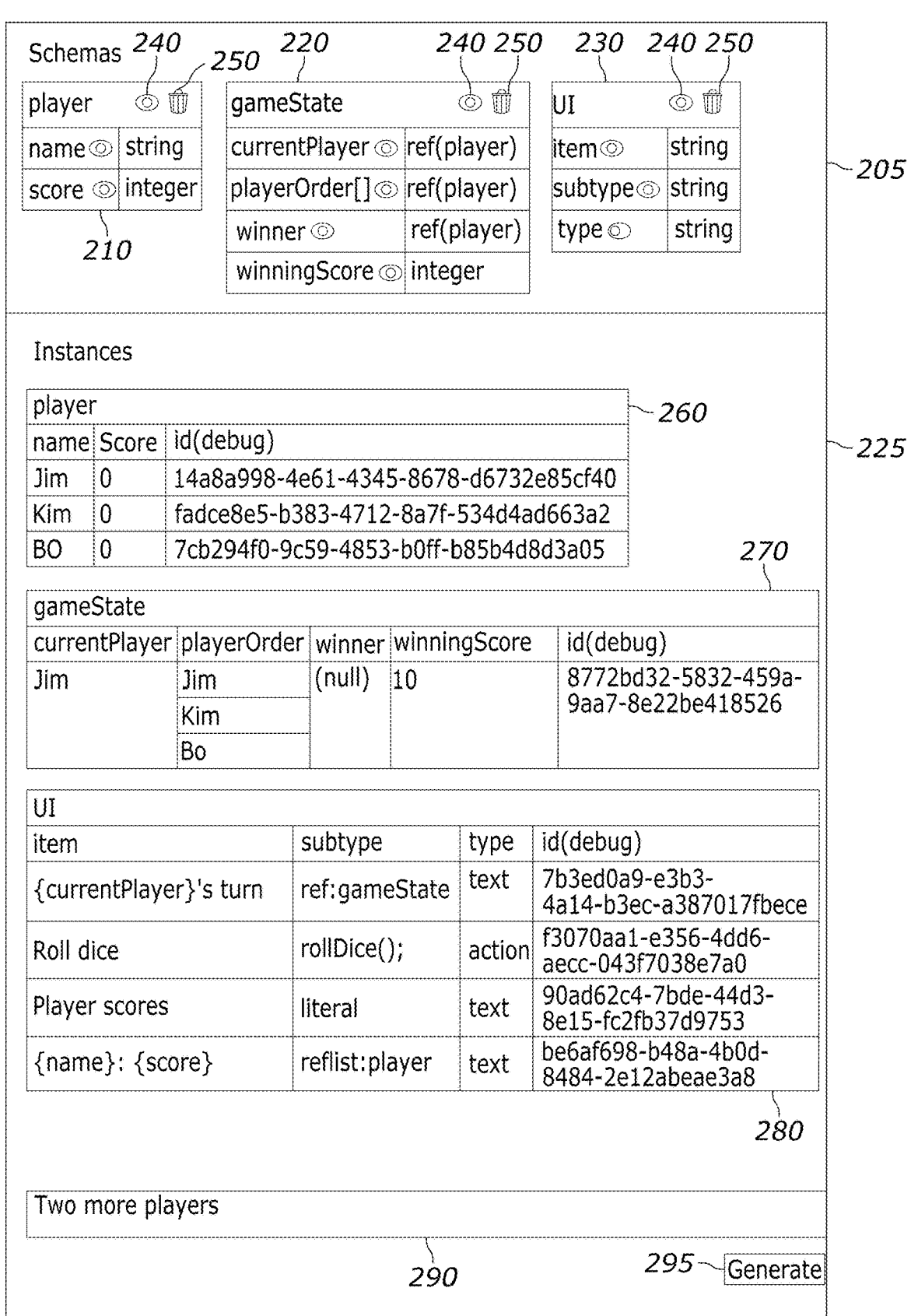
FIG. 2 shows an example graphical user interface (GUI) that may be used to represent different JSON schema and schema instances consistent with present principles.

Examples of these tables are shown in FIG. 2. Accordingly, a graphical user interface (GUI) 200 is shown that may be presented on an electronic display. The GUI 200 may have a first section 205 including a first schema as represented by a first table 210, a second schema as represented by a second table 220, and a third schema as represented by a third table 230. As shown, each table 210-230 may include a respective eye selector 240 to edit the respective table, and a respective trash selector 250 to delete the respective table.

As also shown in FIG. 2, the first table 210 may represent a schema for a video game character/player with attributes for name (string) and score (integer). The second table 220 may represent a schema for a game state of the video game under development, with attributes for current player (with a reference to the first schema of table 210), a player order (with a reference to the first schema of table 210), a winner (with a reference to the first schema of table 210), and a winning score (integer) that does not reference another schema.

In terms of the table 230, it demonstrates that the third schema may be for a user interface and may include attributes for item (string), subtype (string), and type (string). Thus, none of the attributes for the table 230, and hence third schema itself, refer to other schemas.

The GUI 200 may also include a second section 225 of respective tables representing respective instances of the schemas themselves. Accordingly, a first instance of the first schema (as represented by table 210) may be represented as table 260. The table 260 shows that the first instance includes fields for name, score, and object identity (debug) of respective game characters/players listed in the table 260.

The section 225 may also include a second instance of the second schema, as represented by table 270. The table 270 shows that the second instance includes fields for current player, player order, winner, winning score, and identity (debug). It may therefore be appreciated that certain fields in the table 270 have references to players from the table 260, meaning the second instance advantageously contains references to the first instance to quickly build the instances off each other, reducing processing resource consumption and code errors in the process.

Still further, the section 225 may include a third instance of the third schema, as represented by table 280. The table 280 shows that the third instance includes fields for item, subtype, type, and identity (debug). It may therefore also be appreciated that certain fields in the table 280 have references to fields from both of the tables 260 and 270. So here too it is to be understood that the third instance advantageously contains references to the first and second instances, with the video game continuing to be quickly built out with game instances that see each other and refer to each other.

FIG. 2 also shows that the GUI 200 may include a natural language text entry field 290 and a "generate" selector 295. The game developer may thus enter text into the field 290 as a natural language prompt, which is then provided as input to an LLM operating consistent with present principles responsive to selection of the generate selector 295. The LLM may therefore be used to generate additional schemas and schema instances for the same video game under development, with those schemas and instances potentially containing references to each other to link different base elements of the game together from scratch. As such, in the present instance, a natural language prompt has been provided for the LLM to generate two more tables for schema instances of video game players/characters. The LLM might then use the natural language as a prompt to generate two additional tables with specific game characters for the video game owing to the generative nature of the LLM.

Thus, it may be appreciated that, per the references ("refs") shown in some of the tables in FIG. 2 and in the fields in gameState table 260 for individual players themselves (Jim, Kim, Bo), the system can associate schemas with each other. The system may achieve this by assigning each schema and schema instance a unique ID, and then including the respective unique ID within the LLM's input ("prompt") along with the game developer's own natural language. The system can then use those IDs in the output to connect the references.

Now in reference to FIG. 3, another example will be described for rapidly generating and editing structured game data, including through schema/instance fields that reference other generated schema/instances, with the data being presented on a display in a straightforward table format for ease of use compared to current electronic game development systems. This process may involve generating JSON-structured data with LLMs based on another schemas, both as a tactic as well as for actually programming libraries that strictly enforce the schema. But here, in addition to that, the system also bootstraps game content, going from nothing to schema to schema instances while also generating cross-schema references to create systems of data.

Thus, suppose a game developer is just starting out and, as such, is being presented with a GUI 300 controlled by a software application ("app") configured to undertake present principles. As shown, the GUI 300 may include an area 305 that is similar to the area 205 described above, as well as an area 325 that is similar to the area 225 described above. As such, the area 305 may list respective schemas as they are created, while the area 325 may list respective schema instances as they are created.

The GUI 300 may also a natural language text entry field 310 that may be similar to the field 290, and a generate selector 315 that may be similar to the selector 295.

Figure 3:
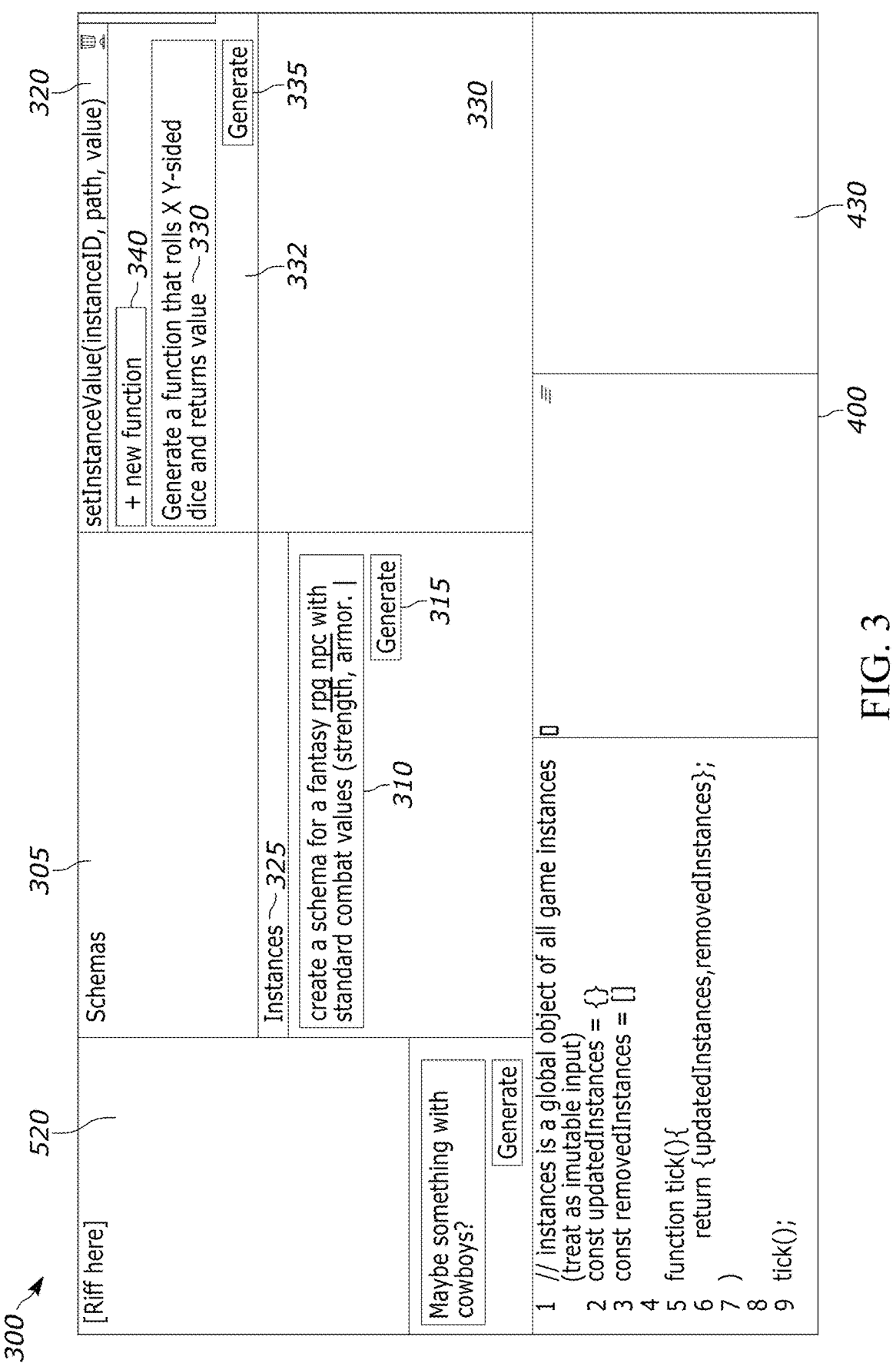
FIGS. 3 and 4 demonstrate various uses of a similar GUI for a computer to design video game schema consistent with present principles.

As also shown in FIG. 3, the GUI 300 may include an area 320 for presentation of Javascript code (or equivalent code) in a box 330. Cursor and text input may even be directed to Javascript code as presented in the box 330 to directly edit the Javascript code itself as presented in the box 330. Accordingly, Javascript code may be generated for different functions of the video game under development, with the game developer entering a natural language prompt for the LLM into text entry box 335. The LLM can then process the input responsive to selection of the "generate" selector 340 to output generative Javascript code based on the prompt, which then gets presented in the box 330. Additionally, respective new functions may be defined by selecting the selector 340 such that the developer might selector the selector 340 and then enter a natural language prompt into the field 332 for the LLM to then generate Javascript code for that respective new/additional function.

Thus, it may be appreciated consistent with present principles that the LLM may be trained to generate JSON using a JSON generator of the LLM (and represent the JSON in tables for respective game objects). The LLM may also be trained to generate Javascript code for respective game functions using a Javascript generator within the LLM. As such, the LLM may be trained on datasets of raw game data and natural language prompts along with respective ground truth JSON and/or Javascript outputs. Various other deep learning techniques may also be used.

In this particular instance, the trained LLM may use its JSON generator to output JSON code (and corresponding tables representing the JSON code) responsive to a natural language text prompt to the box 310. In the present instance, assume the natural language prompt to the LLM is to, "Create a schema for a fantasy RPG NPC with standard combat values—strength, armor, etc." Note here that "RPG" stands for "role playing game", which is a video game genre. Also note that "NPC" stands for "non-player character." Thus, it may be appreciated that even abbreviations and video game lingo may be processed by the LLM based on its training on prior game data for other games to infer user intent. After providing the prompt, the game developer might then select the selector 315 to command the LLM to generate JSON code and a corresponding table for the schema being requested.

Figure 4:
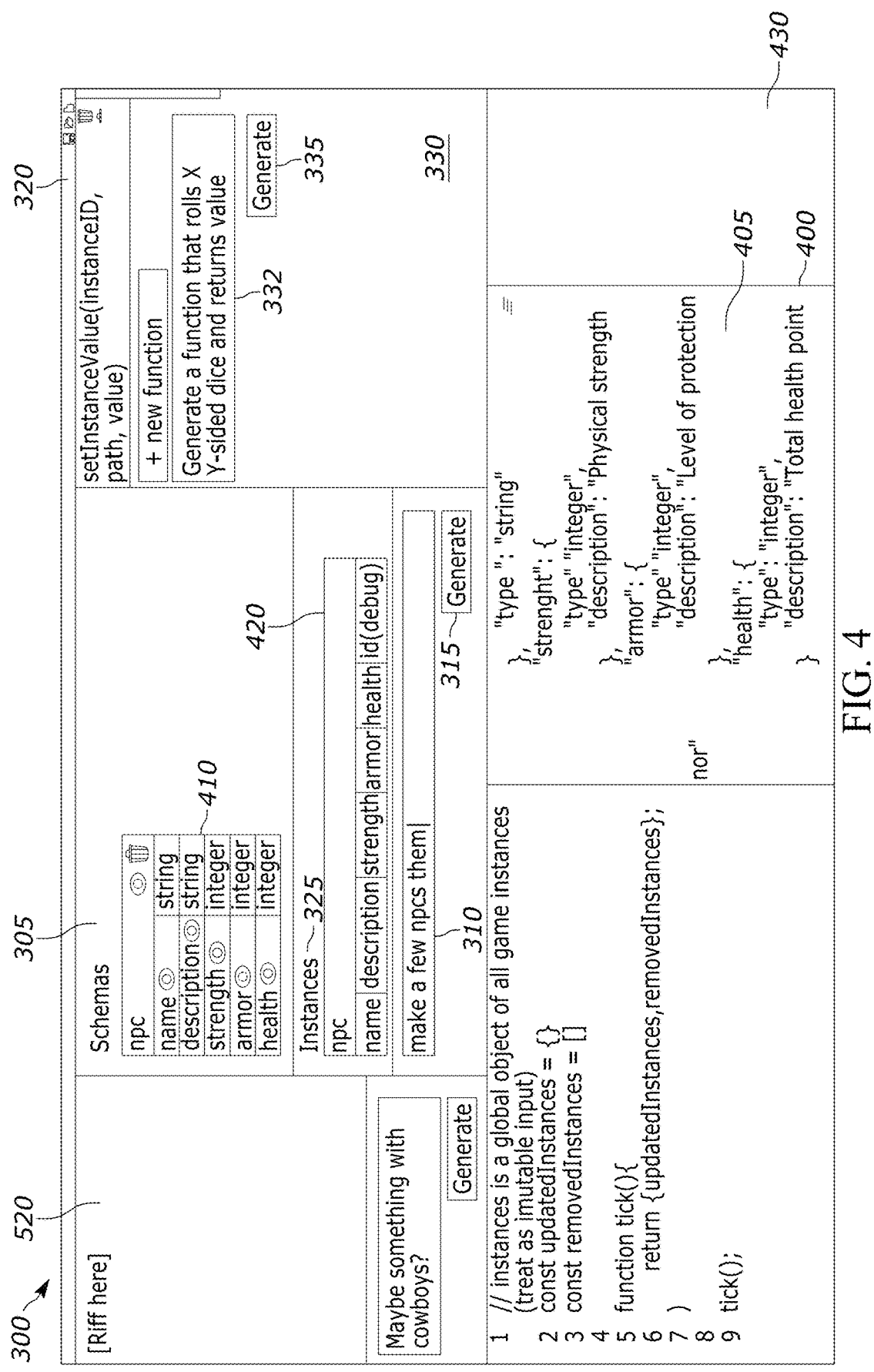

In response the LLM may then generate JSON code 405 that the game development software then presents in code box 400, as shown in FIG. 4. Cursor and text input may even be directed to the JSON code as presented in the box 400 to directly edit the JSON code itself within the box 400. Also note that responsive to editing the JSON code through the box 430 (which presents the JSON code in editable format), the edits may also be auto-populated to the code 400 and respective schema table(s) 410 that represent the structured data of the respective JSON code. Also note that a placeholder table 420 for a schema instance is also shown in FIG. 4 without data being filled into the various fields yet.

Figure 5:
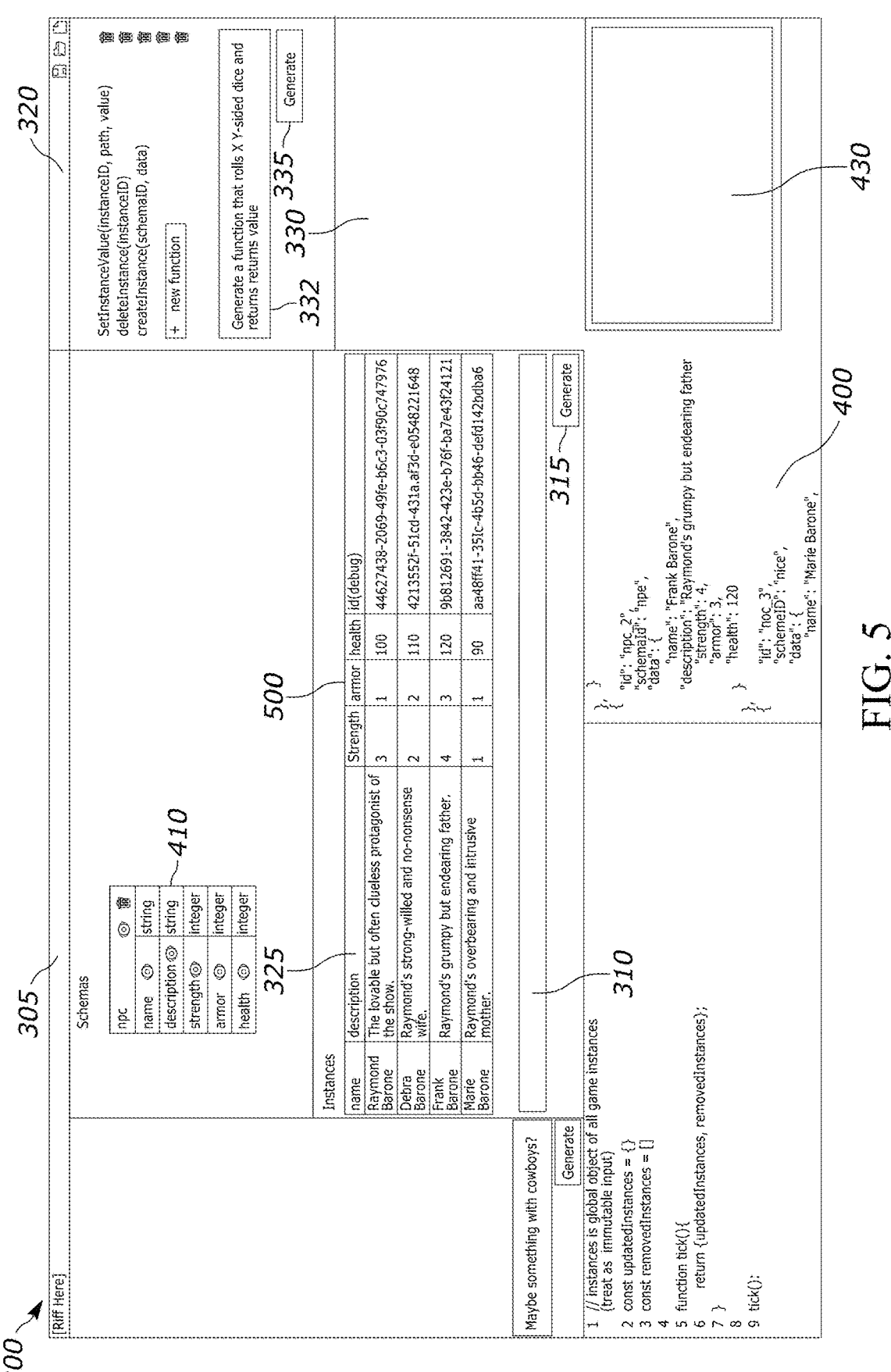
FIGS. 5 and 6 demonstrate various uses of the GUI for a computer to design video game schema instances consistent with present principles.

FIG. 5 then shows that the game developer might enter additional natural language text into the box 310 to "Make a few NPCs themed after 'Everybody Loves Raymond.'" Responsive to receiving the prompt itself, the LLM may then generate a schema instance table 500 and corresponding JSON code 510 for the schema instance itself in conformance with the prompt from the game developer.

Also suppose the game developer wants certain schemas represented in the box 305 to relate to one another. To do so, the developer might then provide another prompt to the text entry field 310 according to the following: "Let's make a schema for places the characters visit—location, name, and description, and ref to character who goes there the most." Responsive to a command to generate the resulting JSON code based on selection of the selector 315, the LLM may then generate additional JSON code according to that prompt, which may then be represented as another schema table 600 as shown in FIG. 6.

Figure 6:
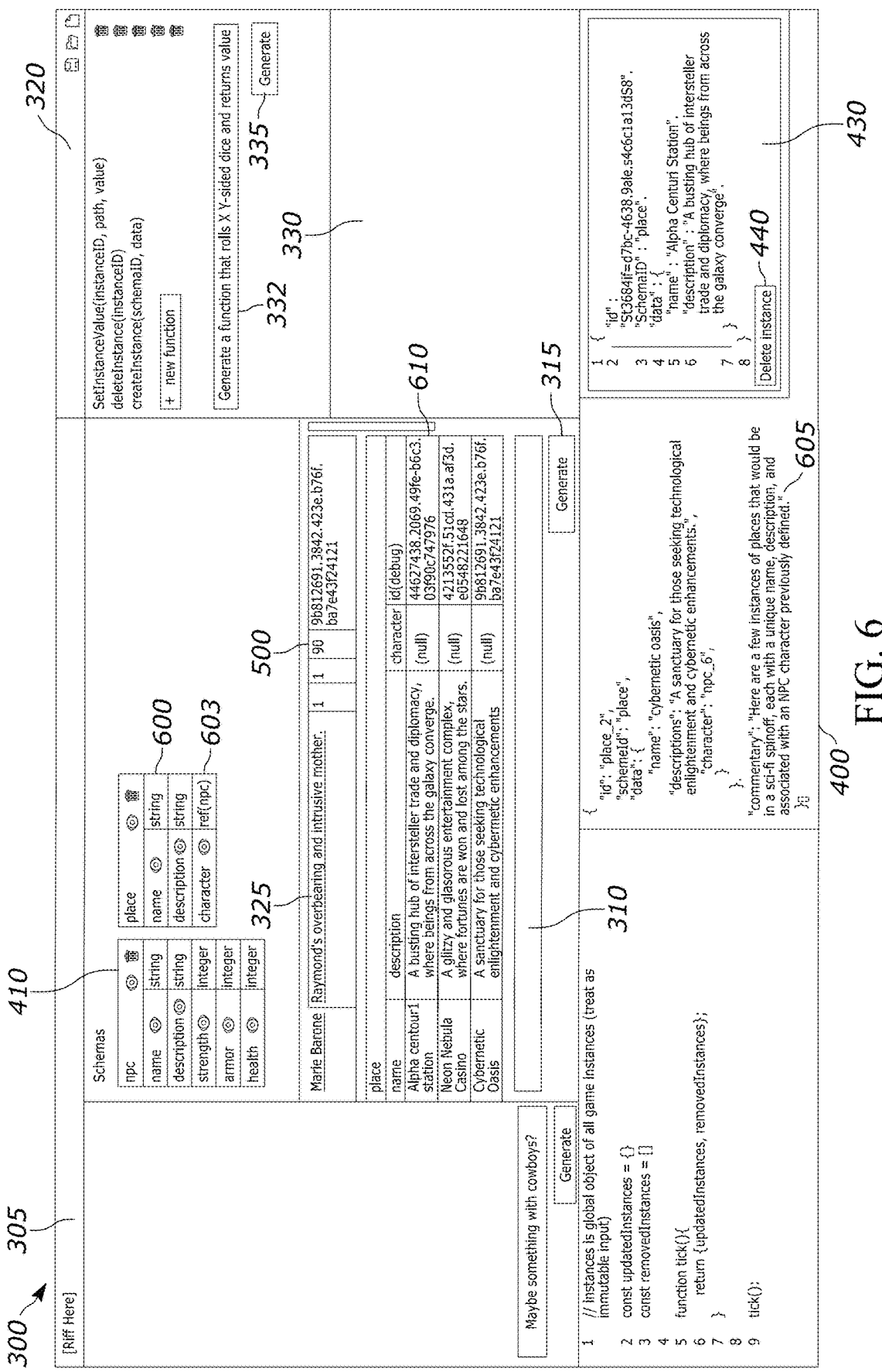

Note that the table 600 of FIG. 6, and hence the structured JSON code 605 in the box 400, contains a reference 603 to another schema—the previously-generated schema represented in table 410 for NPCs. Again note that the JSON code itself may be directly edited by directing input to box 430, and further note that a "delete instance" selector 640 may be presented and then selected by the developer to command the system to delete the respective schema instance (or schema itself, in other examples) represented in the box 430.

Still in reference to FIG. 6, suppose the game developer then enters additional natural language text into input box 310 for the LLM to "Generate a few instances of places that would be in a SciFi spinoff." The LLM may thus infer that this prompt relates to the previously-generated schema represented by table 600 to then generate JSON code and a corresponding schema instance table 610 that represents that JSON code, creating structured game data for a sci-fi spinoff of the television show referenced earlier by the game developer. Note that different game-world places are listed in table 610 for different in-game geolocations that the game characters might visit. The JSON code represented by the table 610 might then also be edited through the box 430, potentially to insert references into the table 610 to other tables such as the schema tables 410, 600 (and hence to insert references to other schema within the structured JSON code itself).

Figure 7:
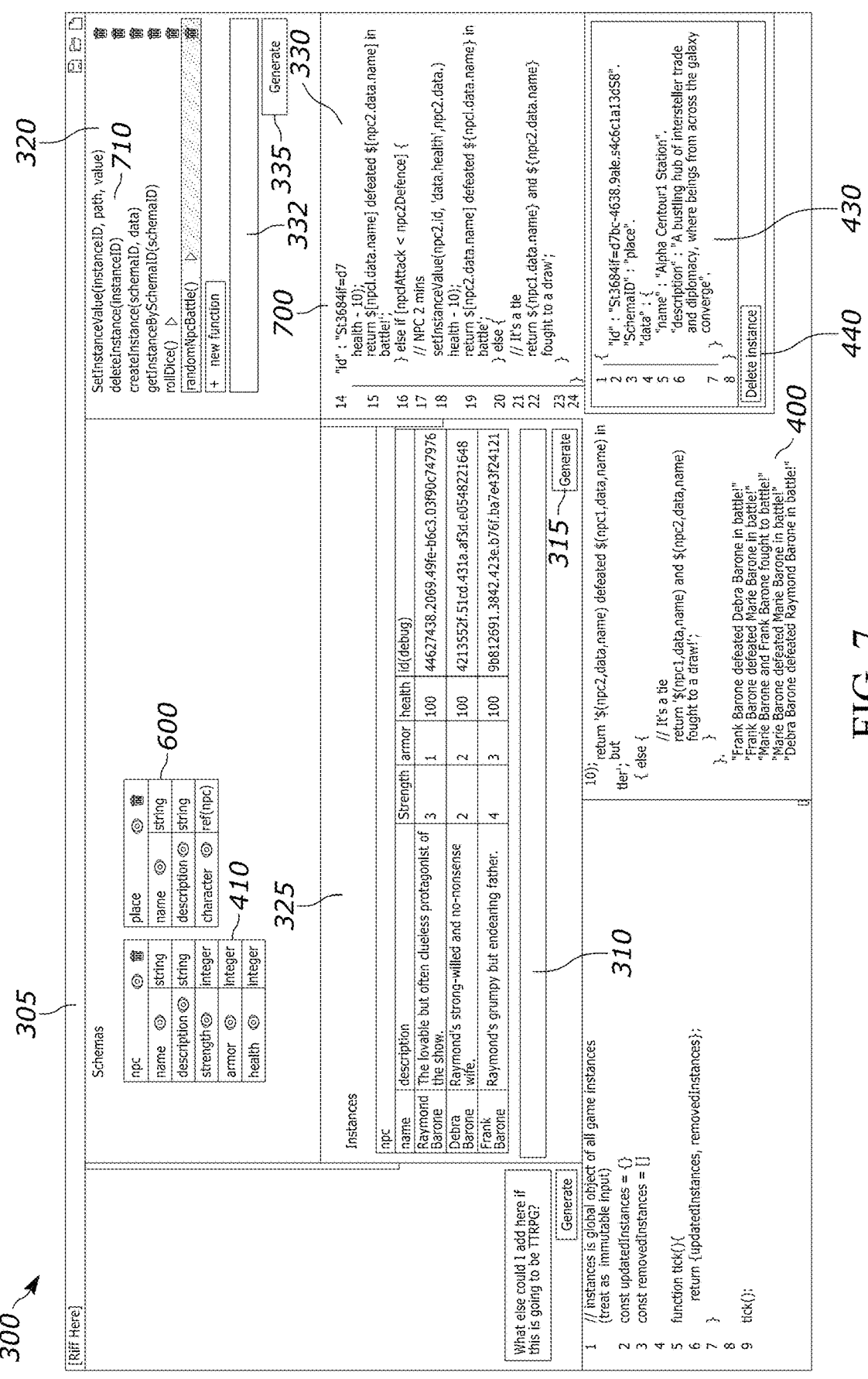
FIG. 7 demonstrates uses of the GUI for a computer to write Javascript code that uses the schemas and schema instances consistent with present principles.

Now suppose the game developer wants to generate a function for the video game that relates to the schemas and schema instances already output by the LLM as represented on the GUI 300 through the tables 410, 500, 600, and 610. FIG. 6 therefore also shows that, to do so, the developer may enter natural language text to the field 332 and then select the selector 335 to command to LLM to use its Javascript generator to generate Javascript code in conformance with the prompt itself. In the present instance, the prompt may be to, "Generate a function that rolls dice and returns value" for the LLM to then return generative, editable Javascript code 700 as inserted into box 330 as shown in FIG. 7. Additionally, if there no arguments to that Javascript, the software can actually run the Javascript and test it on the terminal for the GUI 300. Also note that other available functions 710 may be presented in the area 320 as previously generated by the LLM, if available.

Now suppose the game developer wants to generate another function according to the following text prompt: "Create a random NPC battle," with it being further recognized that the developer might put a function declaration in the box 332 along with that prompt. The LLM can then intuit what the corresponding function should be.

Thus, upon the LLM processing the prompt itself to generate a corresponding function, the Javascript code for the function may be presented in code box 400 and in the box 330 (the box 330 being for editing the Javascript code as described above).

Now suppose the developer is stumped on what to generate next for schemas or schema instances, and wishes the LLM to auto-populate one or more fields of the schemas or instances. To provide a prompt to the LLM to do so, the developer might use a "riff here" area 800 per FIG. 8.

Figure 8:
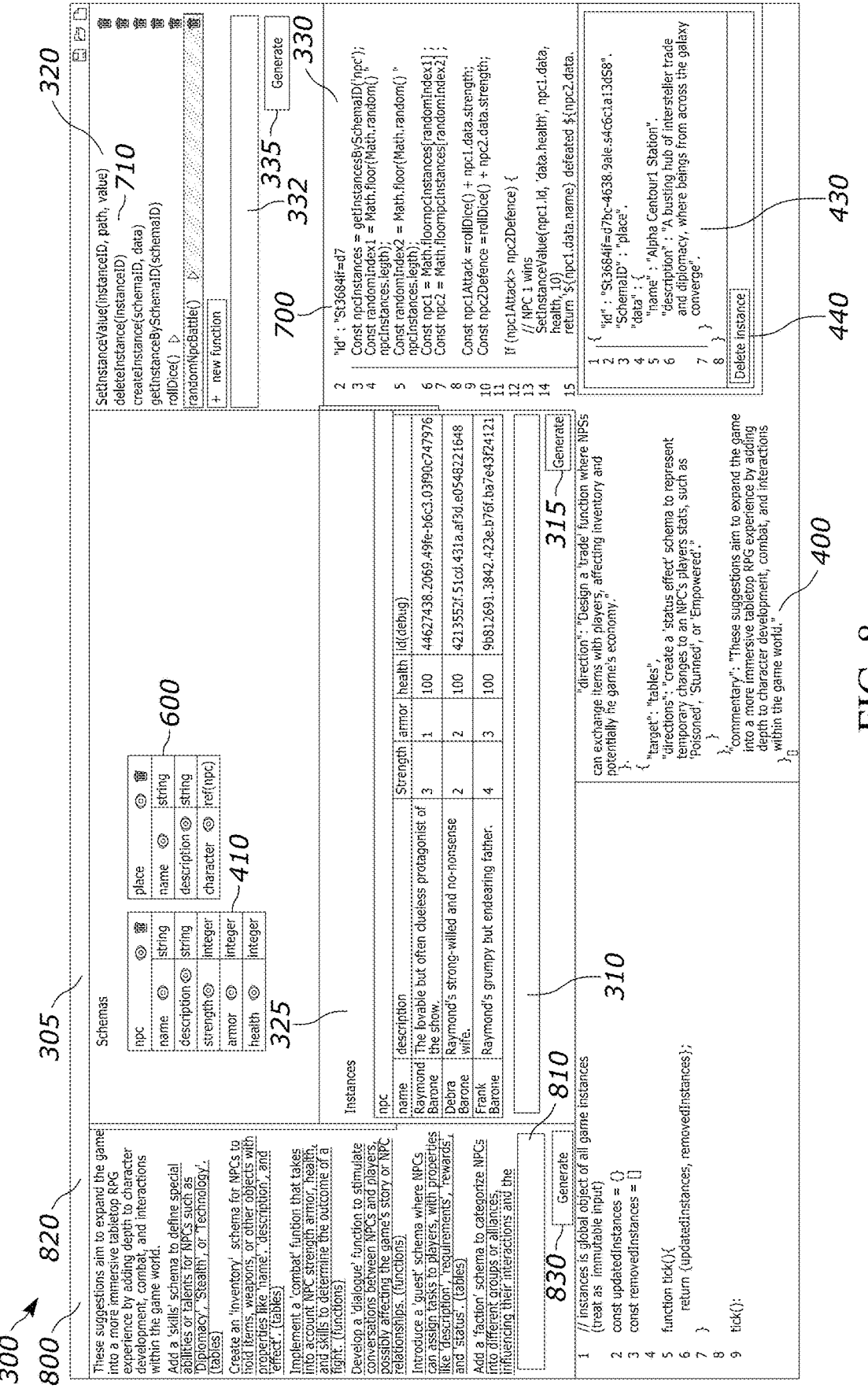
FIG. 8 demonstrates use of the GUI for a computer to provide suggestions for filling in various fields of the schema and/or schema instances consistent with present principles.

As shown in FIG. 8, the area 800 may include a natural language entry field 810 into which a natural language prompt may be entered, with the LLM then generating corresponding natural language auto-suggestions 820 for different fields/attributes of the schema tables and schema instance tables (and hence JSON code itself) presented in the areas 305, 325. The LLM may do so responsive to selection of the "generate" selector 830. Each suggestion 820 may then be selected from the GUI 300 for the generative JSON code of the corresponding suggestions themselves to be presented in the box 400 and edited by the developer consistent with the description above. Each suggestion 820 may also be selected by the developer to accept the suggestion and auto-populate respective fields of the schema and schemas instance tables as presented in the areas 305, 325.

In the present instance, assume the developer has entered the natural language text, "What else could I add here if this is going to be a TTRPG?" Note that "TTRPG" stands for "tabletop role playing game" and assume the LLM has already been trained to understand that reference. So based on the prompt being provided to the LLM, the LLM may generate suggestions for the corresponding fields for the software to then present them as both JSON code in the box 400 and representative table information in the area 305 (e.g., auto-populating previously empty fields in the tables in the areas 305 and/or 325.

It may thus be appreciated through the foregoing step-by-step example how a video game may be built out from scratch using LLMs to generate schemas and schemas instances that reference each other. However, note that while JSON and Javascript code has been described above, other suitable languages/code may also be used for consistent with present principles.

Now in reference to FIGS. 9 and 10, these figures shows example logic that may be executed by an apparatus such as the CE device 12, a client device, and/or a coordinating server alone or in any appropriate combination consistent with present principles. Thus, in some examples the logic may be executed by a client device alone. In other examples, the logic may be executed by the remotely-located server alone. In still other examples, the logic may be executed by a client device and remotely-located server, where the client device performs some steps while the server performs other steps, and/or where the client device and server work together to perform a given step. Further note that while the logic of FIGS. 9 and 10 is shown in flow chart format, other suitable logic may also be used.

Beginning at block 900, the apparatus may receive a first text prompt that indicates a request to create a first schema for a first game object of a video game. Then at block 905 the apparatus may provide the first text prompt to a large language model (LLM) and, at block 910, receive a first output from the LLM. The first output may indicate first structured data for the first schema according to the first text prompt. From block 910 the logic may proceed to block 915 where the apparatus may receive a second text prompt that indicates a request to create a second schema for a second game object of the video game, with the second schema referring to the first schema. From there logic may proceed to block 920 where the apparatus may provide the second text prompt to the LLM to, at block 925, receive a second output from the LLM. The second output may indicate second structured data for the second schema according to the second text prompt, with the second structured data referring to the first schema. The logic may then proceed to block 930 where the apparatus may represent the first and second structured data on a display, such as via the GUI 300 described above.

The logic may then proceed to block 935 where the apparatus may receive a third text prompt that indicates a request to create a first schema instance based on the first schema to then, at block 940, provide the third text prompt to the LLM. Then at block 945 the apparatus may receive a third output from the LLM that indicates third structured data for the first schema instance according to the third text prompt and to, at block 950, represent the third structured data on the display.

After block 950 the logic may then proceed to block 955 where the apparatus may receive a fourth text prompt that indicates a request to create a second schema instance based on the second schema. The logic may then proceed to block 960 where the apparatus may provide the fourth text prompt to the LLM to, at block 970, receive a fourth output from the LLM. The fourth output may indicate fourth structured data for the second schema instance according to the fourth text prompt. The logic may then proceed to block 980 to represent the fourth structured data on the display.

From there the logic may proceed to block 985 where the apparatus may receive a fifth text prompt that indicates a game action to write in Javascript code. Then at block 990 the apparatus may provide the fifth text prompt to the LLM and proceed to block 1000 as shown in FIG. 10. At block 1000 the apparatus may receive a fifth output from the LLM. The fifth output may indicate Javascript code for the game action/function. The logic may then proceed to block 1005 where the apparatus may represent the Javascript code on the display. From there the logic may proceed to block 1010 to receive a command to modify the Javascript code to refer to the first and second schema instances in relation to the game action. For example, a text prompt may be provided to modify a game action/function within the video game using other schema/instances and/or combinations thereof. The logic may then proceed to block 1015 where the apparatus may, based on the command, modify the Javascript code it has already output to refer to the first and second schema instances in relation to the game action. If desired, from there the logic may proceed to block 1020 to save the modified Javascript code for incorporation, according to a plot of the video game, into video game code of the video game. For example, the code may be saved in persistent storage such as a hard disk drive or solid state drive on a client device, and/or in persistent cloud storage.

Now in reference to FIG. 11, this figure shows example AI model architecture that may be implemented consistent with present principles. Thus, an overall AI model 1100 may be established by one or more LLMs. The model 1100 may therefore include a JSON generator 1110 that may be trained to output JSON code as described about. The model may also include a Javascript generator 1120 that may be trained to generate Javascript code as described above. Various deep learning and other AI-based learning techniques may therefore be used for training.

While the particular embodiments are herein shown and described in detail, it is to be understood that the subject matter which is encompassed by the present application is limited only by the claims.

What is claimed is:
1. An apparatus, comprising:
   at least one processor system configured to perform operations comprising:
      receiving a first text prompt, the first text prompt indicating a request to create a first schema for a first game object of a video game;
      providing the first text prompt to a large language model (LLM);
      receiving a first output from the LLM, the first output indicating first structured data for the first schema according to the first text prompt;
      receiving a second text prompt, the second text prompt indicating a request to create a second schema for a second game object of the video game;
      determining whether the second text prompt refers to the first game object;
      in response to determining that the second text prompt refers to the first game object, providing, to the LLM, the second text prompt and an identifier for the first schema;
      receiving a second output from the LLM, the second output indicating second structured data for the second schema according to the second text prompt with the second structured data referring to the first schema; and
      converting the first structured data and the second structured data into a machine-readable format configured to instantiate the first game object and the second game object in the video game.

2. The apparatus of claim 1, the operations comprising:

receiving a third text prompt, the third text prompt indicating a request to create a first schema instance based on the first schema;

providing the third text prompt to the LLM;

receiving a third output from the LLM, the third output indicating third structured data for the first schema instance according to the third text prompt; and representing the third structured data on a display.

3. The apparatus of claim 2, the operations comprising:

receiving a fourth text prompt, the fourth text prompt indicating a request to create a second schema instance based on the second schema;

providing the fourth text prompt to the LLM;

receiving a fourth output from the LLM, the fourth output indicating fourth structured data for the second schema instance according to the fourth text prompt; and representing the fourth structured data on the display.

4. The apparatus of claim 3, the operations comprising:

receiving a fifth text prompt, the fifth text prompt indicating a game action to write in Javascript;

providing the fifth text prompt to the LLM;

receiving a fifth output from the LLM, the fifth output indicating Javascript code for the game action; and representing the Javascript code on the display.

5. The apparatus of claim 4, the operations comprising:

receiving a command to modify the Javascript code to refer to the first and second schema instances in relation to the game action; and based on the command, modifying the Javascript code to refer to the first and second schema instances in relation to the game action.

6. The apparatus of claim 5, the operations comprising:

saving the modified Javascript code for incorporation, according to a plot of the video game, into video game code of the video game.

7. The apparatus of claim 4, wherein the LLM uses a Javascript generator to output the Javascript code.

8. The apparatus of claim 1, wherein the first and second structured data are output by the LLM in JavaScript Object Notation (JSON) format.

9. The apparatus of claim 1, wherein the first and second schemas relate to one or more of: a character for the video game, a weapon for the video game, an inventory asset for the video game, a location within a game world of the video game.

10. A method, comprising:

receiving a first text prompt, the first text prompt indicating a request to create a first schema for a first game object of a video game;

providing the first text prompt to a model;

receiving a first output from the model, the first output indicating first structured data for the first schema according to the first text prompt;

receiving a second text prompt, the second text prompt indicating a request to create a second schema for a second game object of the video game;

determining whether the second text prompt refers to the first game object;

in response to determining that the second text prompt refers to the first game object, providing, to the model, the second text prompt and an identifier for the first schema;

receiving a second output from the model, the second output indicating second structured data for the second schema according to the second text prompt, the second structured data referring to the first schema; and converting the first structured data and the second structured data into a machine-readable format configured to instantiate the first game object and the second game object in the video game.

11. The method of claim 10, wherein the model comprises a large language model (LLM).

12. The method of claim 10, comprising:

receiving a third text prompt, the third text prompt indicating a request to create a first schema instance based on the first schema;

providing the third text prompt to the model;

receiving a third output from the model, the third output indicating the first schema instance according to the third text prompt; and representing the first schema instance on a display.

13. The method of claim 12, comprising:

receiving a fourth text prompt, the fourth text prompt indicating a request to create a second schema instance based on the second schema;

providing the fourth text prompt to the model;

receiving a fourth output from the model, the fourth output indicating the second schema instance according to the fourth text prompt; and representing the second schema instance on the display.

14. The method of claim 13, comprising:

receiving a fifth text prompt, the fifth text prompt indicating a game action to write in programming code;

providing the fifth text prompt to a programming code generator;

receiving a fifth output from the programming generator, the fifth output indicating programming code for the game action; and representing the programming code on the display.

15. The method of claim 14, comprising:

tailoring the programming code to refer to the first and second schema instances in relation to the game action.

16. The method of claim 13, wherein the first, second, third, and fourth structured data are output by the model in JavaScript Object Notation (JSON) format.

17. An apparatus, comprising:

at least one processor system configured to perform operations comprising:

receiving a first text prompt, the first text prompt indicating a request to create a first schema for a first game object of a video game;

providing the first text prompt to a large language model (LLM);

receiving a first output from the LLM, the first output indicating first structured data for the first schema according to the first text prompt;

receiving a second text prompt, the second text prompt indicating a request to create a second schema for a second game object of the video game with the second schema referring to the first schema;

providing the second text prompt to the LLM;

receiving a second output from the LLM, the second output indicating second structured data for the second schema according to the second text prompt with the second structured data referring to the first schema;

converting the first structured data and the second structured data into a machine-readable format configured to instantiate the first game object and the second game object in the video game;

receiving a third text prompt, the third text prompt indicating a request to create a first schema instance based on the first schema;

providing the third text prompt to the LLM;
receiving a third output from the LLM, the third output
indicating third structured data for the first schema
instance according to the third text prompt; and
representing the third structured data on a display.

* * * * *